Feb. 25, 1969  A. FEATHER  3,429,960
METHOD OF TWO-SECTION SLUSH MOLDING
Filed March 4, 1966  Sheet 1 of 3
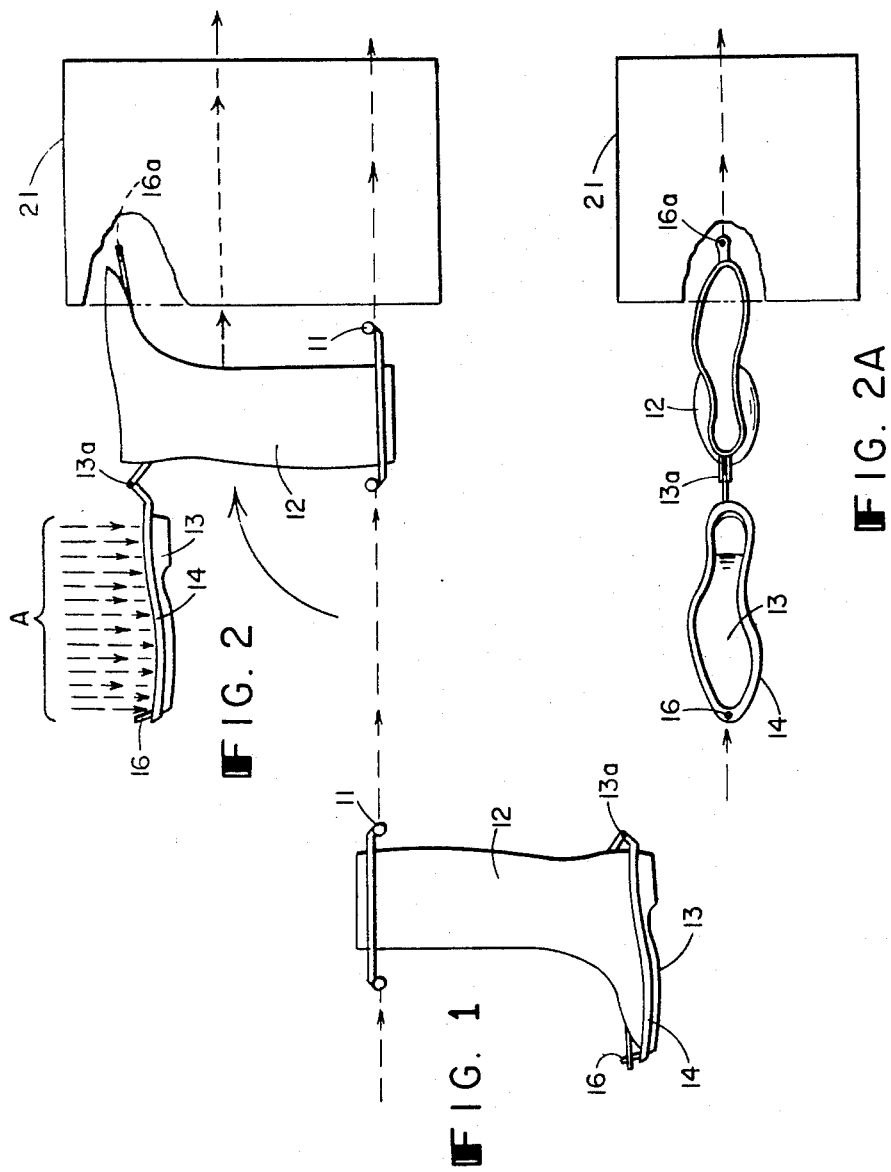
INVENTOR
ALEC FEATHER

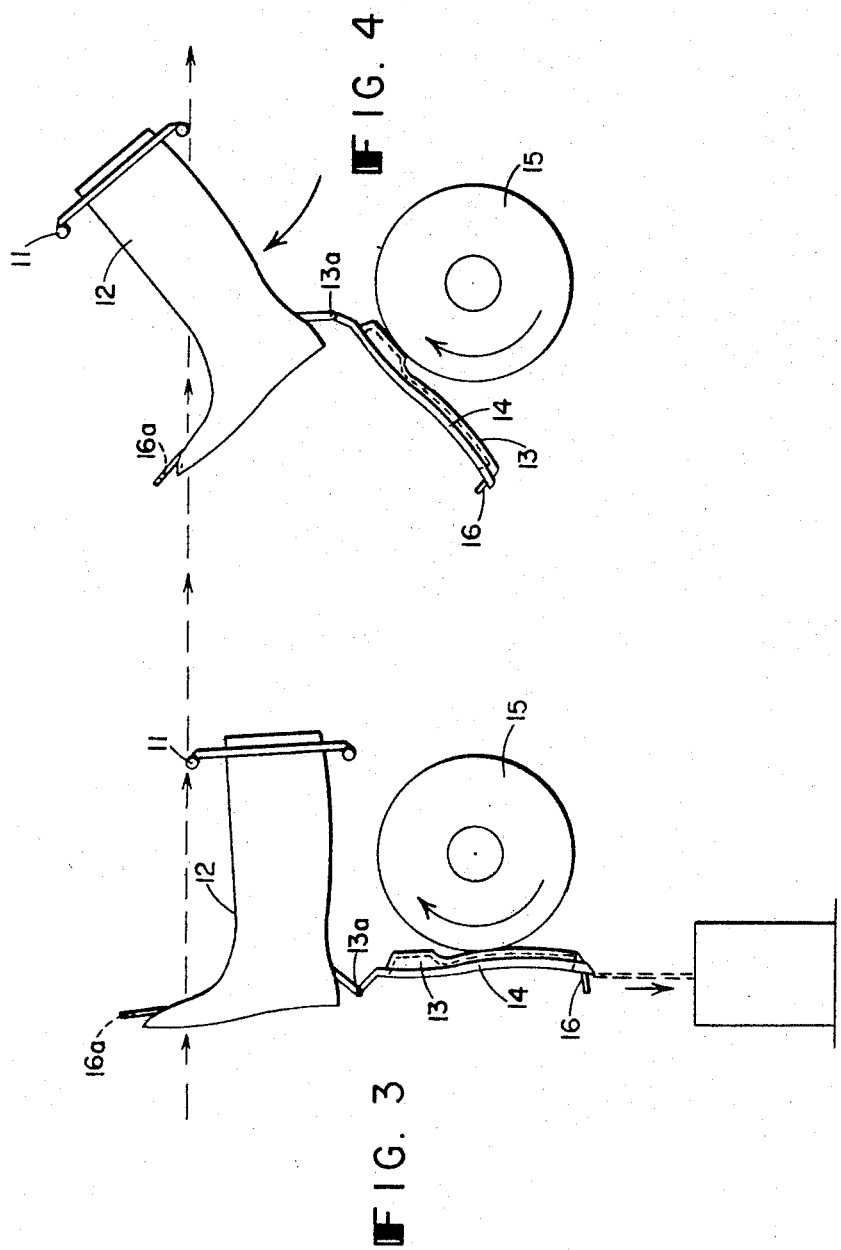

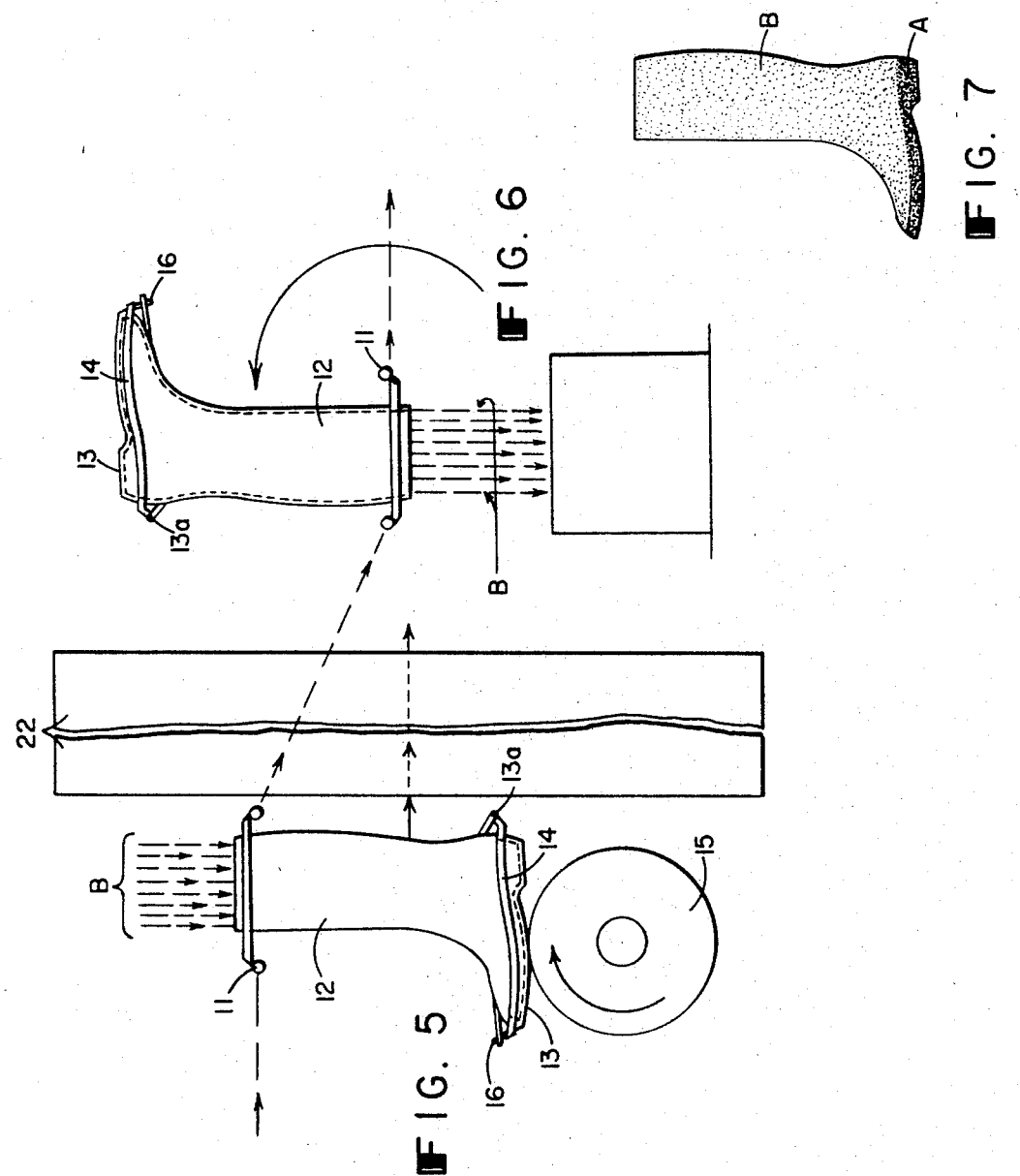

United States Patent Office 3,429,960
Patented Feb. 25, 1969

3,429,960
METHOD OF TWO-SECTION SLUSH MOLDING
Alec Feather, Derry, N.H., assignor to Tech Consolidated Inc., Derry, N.H., a corporation of New Hampshire
Filed Mar. 4, 1966, Ser. No. 531,889
U.S. Cl. 264—245    4 Claims
Int. Cl. B29c 9/00

ABSTRACT OF THE DISCLOSURE

An integral molded boot is formed by slush molding where the sole section is of different material or color than the upper section. A hollow mold is used comprising an upper section hinged to a bottom section. The bottom section is filled first with a plastisol then gelled. A second plastisol is poured into the top section and gelled. The layers are then fused.

---

This invention relates to a novel molded article formed as a single integral unit from two different molding materials. In particular, it relates to an integral molded boot, wherein the sole section is of different material than the upper section.

Initially fluid plastic molding materials, such as plastisols which are generally 100% solid resin dispersions, have been widely used in molding of various objects and articles because of their relatively low cost of processing as compared with other molding techniques. In particular, there has been developed a technique known as slush molding. Slush molding has been adapted for continuous conveyor systems, particularly in the manufacture of boots. Thus, Porter, U.S. 2,588,571 describes the process of slush molding wherein the initially fluid plastic molding material is poured into the mold and external heating applied to cause gelling or curing of the layer of material adjacent to the mold itself. The excess uncured liquid material is then poured out from the mold. The coating layers which remain are subjected to further heating to complete the drying and fusion resulting in a fully formed article. In slush molding techniques, the mold itself is a single closed member having a single opening for receiving the charge of material.

In accordance with the present invention, a special mold is employed which permits the resin buildup to be done in two separate but consecutive stages. Thus, the first stage comprises the formation of the sole section of a boot while the second stage comprises the formation of the upper section and fusion thereof to the sole section.

The present invention comprises generally providing a mold divided into a bottom section hingedly connected to the upper section. The bottom section is provided with a peripheral flange. The mold is then so arranged and handled on the conveyor that the upper section of the mold is rotated away from the bottom section to permit dispensing of a first plastisol into the open side of the bottom section of the mold. The bottom section is filled, with the flange permitting full distribution. The mold is then moved without rotation into a first heating zone so as to form a gelled or cured layer adjacent the bottom mold interior. As soon as this first gelled bottom layer has been formed, the mold is tipped so as to pour out the excess plastisol from the bottom section leaving the bottom section with a minute edge on the flange. The mold is then manipulated so as to lock the bottom and upper sections together and tipped so that the top part of the upper section is now upward. Then a second different plastisol is charged into the mold. The second charge fills the entire mold including the hollow portion in the bottom section. The mold is passed into a second heating zone to provide a buildup of the upper layer which joins with the bottom layer. After this heating step, the entire mold is then tipped whereby the excess uncured second plastisol falls out. What remains is the first or bottom section resin layer joined to the second or upper section resin layer. The mold is then given further heating to achieve final drying and fusion. The further steps of cooling and stripping follow conventional slush molding techniques.

A preferred embodiment of this invention as applied to two-color boots is described in the drawings wherein:

FIG. 1 is a schematic view of the mold on its mold carrier prior to the first filling step.

FIG. 2 is a schematic view of the inverted mold receiving the first stage or sole plastisol material and then passed through a first heating zone.

FIG. 2A is a top view of FIG. 2.

FIG. 3 is a schematic view showing the mold tipped so as to discharge the ungelled or excess first stage material from the sole section of the mold.

FIG. 4 shows the mold in the process of being closed after the excess sole material has been discharged.

FIG. 5 is a schematic view of the mold sections in closed and upright position receiving the second stage or upper boot material and being passed through the second heating zone.

FIG. 6 is a schematic view of the closed mold inverted so as to discharge the excess or ungelled second stage material from the mold.

FIG. 7 is a side view of the integral two-color boot resulting from the method described.

Referring now to the drawings, there is illustrated therein a metal mold 12 whose inside surface is made to conform to the outside surface of the boot. The mold 12 has a lower or sole section 13 which is mounted on one side of a hinge 13a connected on its other side to the upper section of the mold. A spring loaded pin 16 on the sole section 13 is provided for locking into a registering orifice 16a on an extension of the upper boot section 12. The mold, when suspended as illustrated in FIG. 1 remains closed, the spring action being sufficient to maintain the lock 16, 16a. A peripheral flange or lip 14 is provided at the top of the open edge of the sole section 13. The entire mold is suspended on the schematically illustrated mold carrier 11 which enables the mold to be moved through a predetermined series of locations by means of a conveyor. Inasmuch as conveyors for moving and manipulating molds or the like are conventional and are not part of this invention, no attempt is made herein to describe the details of any conveyor apparatus except as may be essential to illustrate the method of this invention.

FIG. 1 illustrates the normal position of a conventional boot mold for slush molding. By means not illustrated, the mold carrier 11 is turned 180° clockwise which causes the mold to unlock and position the sole section 13 with its open end upward, while the upper section 12 is inverted and adjacent. It is readily understood that hinge 13a is so constructed as to limit the opening motion of the sole mold portion 13 to the position illustrated in FIG. 2. While the mold is open as illustrated in FIG. 2, plastisol A is dispensed into the sole portion 13 until it forms just an edge on the flange 14.

While maintained in the position illustrated in FIG. 2, the mold carrier is moved to bring the open filled sole mold portion through a first buildup oven 21 where sufficient heat is applied according to conventional plastisol techniques so as to give an initial cure to the desired thickness inward from the sole mold portion. While this invention is not limited to ovens of any particular construction, it is preferred to use a controllable system such as an infra-red oven which will provide variable intensities of heat. In connection with such an oven, a mold with good transfer characteristics but little heat retention is used so that the plastisol will be evenly cured. A typical material for a mold for an infra-red oven is an alloy of nickel and copper which can be painted black or silver to pass or block heat at desired points. When the mold is passed through the first buildup oven, the heat which penetrates, gels the plastisol in contact with the mold to a thickness which can be controlled and is in direct proportion to the intensity of the heat at that point.

After passing through the first buildup oven 21, the mold carrier 11 is now turned 90° counterclockwise as illustrated in FIG. 3. The sole section 13 is kept vertical by roller 15 so that the motion of the mold carrier 11 permits the excess ungelled material A to be discharged. After this discharge the apparatus is so arranged that the mold carrier 11 is now turned further counterclockwise and in conjunction with the roller 15, as illustrated in FIGS. 4 and 5, causes the mold to close and lock and be now in the upright position as illustrated in FIG. 5. At this point, the sole section 13 has a gelled buildup of the desired thickness but there is nothing else in the mold. Thereupon, the second plastisol B is dispensed so as to fill up the entire boot mold, including the hollow space in the sole section. The mold is then passed through a second buildup oven 22 similar to the buildup oven 21 in its general principles of operation. After there has been a sufficient buildup of gelled plastisol in the upper section 12, the mold carrier is turned further counterclockwise until it is now upside down, but locked together, thus permitting dumping of the excess material B.

It is to be understood that although the process exemplified in the drawings and described herein comprises a single resin layer or skin, this invention also includes building up a second or further skins. Thus, after discharge of the second plastisol, the entire mold is passed into another oven after which it can be recycled for a second skin.

The conventional final steps, although not illustrated, comprise passing the mold with the various gelled skins through what is known as a fusion oven wherein there is sufficient heat to completely dry and solidify the resin in the mold so as to provide an integral fused boot, as illustrated in FIG. 7, wherein the upper portion is made from material B and the sole portion from material A.

The materials need not be completely different but can, for example, include differently colored plastisols of the same type. Plastisols commonly used in the manufacture of boots and similar objects by slush molding are generally made from polyvinyl chloride.

I claim:
1. A method of two-section slush molding comprising:
   (a) providing a hollow mold comprising an upper section with a single open end detachably connected to a closed bottom section,
   (b) opening the mold so as to expose the interior of the bottom section and move the upper section away,
   (c) filling the bottom section up to its top edge with a first plastisol,
   (d) heating said bottom section to form a gelled layer adjacent the walls of said bottom section,
   (e) tipping said bottom section to pour out excess plastisol,
   (f) moving said upper section so as to close over said bottom section,
   (g) filling the mold with a second different plastisol through the open end of said upper section,
   (h) heating the mold to form a gelled layer adjacent the walls of said upper section,
   (i) tipping the mold to pour out excess second plastisol and
   (j) fusing said gelled layers.
2. The method of claim 1 wherein the mold used comprises an upper section hingedly connected to the bottom section.
3. The method of claim 1 wherein the first and second plastisols differ in color.
4. The method of claim 1 wherein the bottom section of the mold provides essentially the sole portion and the upper section the upper portion of a boot, with the resultant fused product being unitary in the shape of a boot with a different material in its sole portion than in its upper portion.

References Cited

UNITED STATES PATENTS

| | | | |
|---|---|---|---|
| 2,147,770 | 2/1939 | Ford | 264—245 X |
| 2,277,543 | 3/1942 | Downs | 264—246 |
| 2,652,592 | 9/1953 | Williams | 264—255 X |
| 2,880,467 | 4/1959 | Wibbens | 264—308 X |
| 3,035,309 | 5/1962 | Bingham | 264—255 |
| 2,662,308 | 12/1953 | Loewengart | 36—7.3 |
| 2,753,635 | 7/1956 | Eade | 36—7.3 |
| 3,198,864 | 8/1965 | Bingham | 36—7.3 |

ROBERT F. WHITE, *Primary Examiner.*

T. J. CARVIS, *Assistant Examiner.*

U.S. Cl. X.R.

264—244, 255; 36—7.3